Patented Nov. 29, 1927.

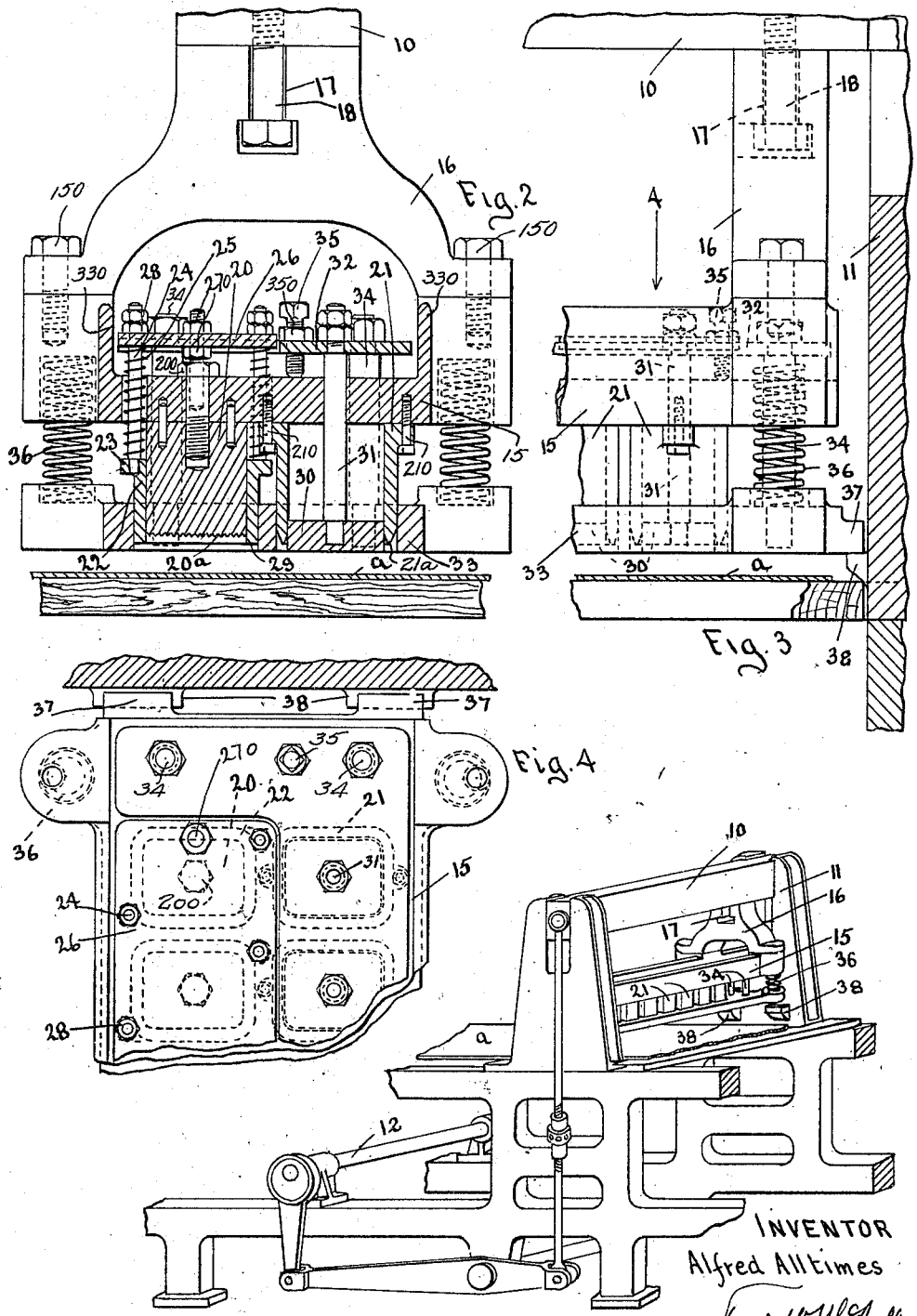

1,650,682

UNITED STATES PATENT OFFICE.

ALFRED ALLTIMES, OF SOUTH MEDFORD, MASSACHUSETTS.

CUTTING AND EMBOSSING DEVICE FOR BISCUIT MACHINES.

Application filed October 15, 1926. Serial No. 141,845.

My invention relates to devices for embossing and cutting a variety of forms and patterns from sheet dough.

This is now done with existing machines by means of separate operations, or with separate devices coordinated in the same machine, in either case requiring expensive and intricate mechanism to perform the two operations.

One object of my invention is to provide a device which shall perform both operations on the advancing sheet of dough, in each cycle of operations, and with one operating mechanism.

A second object is to provide such a device, applicable to existing machines, and adapted to replace the particular device for embossing or cutting used for either embossing or cutting, and which is secured to the crosshead of the particular machine.

A further object is to provide in connection with my device, means for stripping the dough positively from both the embossing and the cutting units, thus preventing distortion of the sections cut from the moving sheet of dough.

To accomplish these objects, I combine in one head, attachable to the crosshead of the machine, both the embossing and the corresponding cutting units, the embossing unit being mounted to impress the selected pattern on the dough sheet, and as the sheet advances, to cut the embossed surface in the succeeding cycle of operations, the embossing unit and the corresponding cutting unit being mounted in line parallel with the line of travel of the sheet of dough.

It will be evident that after the first cycle of operations, in which one form is cut without embossed surface, that thereafter, in each cycle, an embossed section is cut from the dough sheet, and moves forward with it to be panned. These units are mounted in multiple, to operate across the full width of the sheet of dough.

My invention consists in the combination of devices for the two purposes, and the novelties in construction and operation, together with other features that will appear in the accompanying specification and claims, and the drawings forming a part thereof.

In the drawings:—

Fig. 1 shows a portion of a machine in which my device is shown as replacing the embossing or cutting device used.

Fig. 2 is a cross section of my device.

Fig. 3 is a portion showing the side elevation at one end.

Fig. 4 is a corresponding plan viewed in line 4, Fig. 3.

I have preferred to show in Fig. 1 a portion of a biscuit cutting and embossing machine as best suited to indicate the advantages of my device as compared with existing practice. In the particular machine from which this portion was taken, two crossheads are used, one to support the embossing devices, the other, the cutters. The crossheads are actuated by separate connections of the nature shown, and the movements are coordinated to perform the same service that my device accomplishes with one crosshead, which thus eliminates one crosshead with accompanying operating mechanism. In some machines for this purpose, the two operations are performed by other independent coordinated devices, with more or less intricate mechanism, and in other machines of the same general character, only one operation is performed. It is my purpose to use my device with any of these machines in which a crosshead is reciprocated to emboss or cut the sheet of dough.

Referring to the drawings, the crosshead 10, slidable in the standards 11, is reciprocated from the shaft 12, forming a part of the machine mechanism. As this is old in the art, further description of the structure and operation is omitted as being obvious.

The crosshead 10 being common to the types of machines above referred to, I am enabled to replace the embossing or the cutting devices, as the case may be, with my device, securing it rigidly to the crosshead of the particular machine. This device is shown in detail in Figs. 2, 3, and 4, and the following description will apply to any form or pattern of embossing and cutting used, the details subject only to such variations as may be required for the particular machine with which it is used.

The bridges 16 are bolted to the bed plate 15 by means of the bolts 150 and are provided with sockets 17 in which the bolts 18 engage, to secure each bridge to the crosshead 10, in such manner that the whole device may be readily attached or released to be replaced by one in which other forms are used.

To the bedplate 15 are secured the embossing blocks 20 and the cutters 21, by means of the bolts 200 and 210 respectively, in corresponding multiples, the embossing blocks in such relation to their respective cutters that the surface embossed in one cycle is severed by the corresponding cutter in the next. Slidably mounted on each of the embossing blocks is a stripper 22, provided with lugs 23, projecting from which, upwardly, are the studs 24, which serve as arbors for the springs 25. The bed plate 15 is formed with holes through which the springs and studs may pass, and the studs are slidable in a plate 26, which is adjustable relative to the face of the bed plate 15, a means for such adjustment and securing the plate in adjusted position, being shown, in which the studs 27, rigidly projecting upwardly from the bed plate 15, are threaded at their upper ends to receive the nuts 270. The plate 26 is perforated to permit the passage therethrough of these studs, and by means of the nuts 270, the plate may be adjusted relative to the surface 20ª of the embossing block 20. The studs 24 are also threaded at their upper ends to receive the nuts 28, by means of which each stripper may be independently adjusted longitudinally with its particular embossing block and in relation to the plate 26.

The stripping edge 29 is adjusted so that as the crosshead is reciprocated to operate the embossing unit, the stripper acts as a presser to contact with the dough sheet before the embossing face 20ª, yielding through the means described, and on the return movement, the embossing face is withdrawn before the stripper edge releases the dough sheet. As the action of the machine is rapid relative to the movement of the dough, there is no tendency for the dough to bank on the stripper while it is in contact. This is a departure from existing methods, and the present tendency for the embossing block to lift the dough, is overcome; this forms an important feature of my invention as a means of overcoming distortion and banking of the dough sheet, and operates to increase both economy and efficiency by permitting a more rapid action of the device. The cutter corresponding with each embossing unit, is provided internally with a plunger 30, from which extends upwardly, the stud 31, slidable in the bedplate 15, and secured at its upper end to a plate 32, above the bed plate and within ribs 330 formed on the bed plate. The lower faces of the several plungers 30 are so positioned that they are in the plane of the stripping face of the clearer 33, in which the embossing block strippers and the cutters are slidable. Adjustment of the clearer 33 relative to the embossing face 20ª and the cutter edge 21ª, is provided, and a convenient means is here shown. Rigid with the clearer, and upwardly extending, and slidable in the bed plate 15, are studs 34, secured at their upper end to the plate 32. Set screws 35 in the plate 32, govern the adjustment of the clearer in relation to the face of the bed plate 15, the check nuts 350 being employed to retain the plate 15 in adjusted position. I provide four or more studs 34 to insure parallelism with the apron $a$ of the machine, on which the dough is carried. The adjustment and operation of my device is as follows:—The embossing and cutting elements of the particular design to be produced, is assembled with the clearer and the bed plate, in a single unit as hereinbefore described. The bridges form a part of this unit and are attached to the crosshead 10 by means of the bolts 18 which engage respective sockets 17 in the bridges. The plate 32 is then adjusted relative to the cutting edges 21ª. Each embossing block stripper is then adjusted in like relation to its particular block by means of the studs 24 and the check nuts 28 which are set to retain the adjusted position of the individual strippers. This position being the same in all the strippers relative to the embossing surfaces, 20ª, the plate 26 is then adjusted by means of studs 27 and the nuts 270 to the particular relation required for the stripper surfaces 29 in relation to the under side of the clearer 33. The device is now ready for operation and as the dough sheet is advanced, the crosshead is reciprocated, and in the first cycle of movements a series of unembossed forms lateral with the movement of the dough sheet, are severed, and a corresponding series of embossed impressions made on the dough sheet in the rear of the cutters and aligned therewith in the direction of the moving dough sheet. As explained the movement of the dough sheet is coordinated with the reciprocation of the crosshead, and in the second and subsequent cycles, the embossed surface of the dough sheet is advanced to be severed by the corresponding cutter in the succeeding cycle. The rapidity of action of the embossing blocks and the cutters is such that no banking of the dough, nor distortion of the embossed pattern is experienced as the respective elements engage the dough sheet. As the dough sheet with the severed forms and surrounding scrap advances, the severed sections are removed to be panned and the scrap is returned to be incorporated with the dough supply. The bed plate 15 and the clearer 33 are formed with corresponding sockets in which are mounted the compression springs 36, which yieldingly retain the two members in the required relation. As the crosshead together with the attached device, descends projections 37 from the clearer, engage abutments 38 extending from the frame of the machine. These are so positioned that at its lowest position, the clearer face is close to the moving sheet of dough on the apron $a$, the springs 36 yielding to permit the full stroke of the crosshead necessary to perform the functions required. When the clearer abuts the projections 38, continued movement of the crosshead causes the embossing strippers to engage the dough sheet and press thereon while the embossing surface impresses the pattern, and at the same time the surface embossed in the previous cycle, is severed by the cutters. As the crosshead rises, the embossing block and the cutters leave the sheet of dough, the embossing strippers operating to retain the sheet against adhesion to the block, and the combined action of the clearer and the plungers of each cutting unit operating to strip the dough from the cutting edges and retain the severed form and the resulting scrap dough on the apron. It is thus possible to clear the scrap even when a particular embossing block or cutter operates on an imperfect or distorted portion of the dough sheet. Attention is called to the fact that the embossing strippers are not only individually adjustable, but all may be adjusted together which makes it possible to vary the pressure of the strippers on the sheet of dough after setting, without individual adjustment.

Among the advantages of my device are positive action of both embossing and cutting units; accurately embossed and cut forms; positive stripping from both embossing and cutting units, and consequent rapidity of action; and by means of my device, I accomplish what now requires complicated machines, and do it with no adjusting or setting after the first set up.

Having thus described my invention, I claim:—

1. In an attachment for a dough cutting or embossing machine, including as elements a bed plate, a plurality of embossing blocks and corresponding cutting elements secured to the bed plate; individual stripper elements, slidable lengthwise of the embossing blocks, each yieldingly secured relative to the face of its respective embossing block and the bed plate.

2. In an attachment for a dough cutting or embossing machine, including as elements a bed plate, a plurality of embossing blocks and corresponding cutting elements secured to the bed plate; stripper elements, slidable lengthwise of the embossing blocks, and yieldingly secured relative to the respective faces thereof and the bed plate, and means for adjusting the stripping surface of each stripping element relative to the respective embossing face.

3. In an attachment for a dough cutting or embossing machine, including as elements a bed plate, a plurality of embossing blocks and corresponding cutting elements secured to the bed plate, stripper elements, slidable lengthwise of the embossing blocks, and yieldingly secured relative to the respective faces thereof and the bed plate; and means for adjusting the stripping surfaces of the stripping elements, individually and collectively relative to the embossing faces.

4. In an attachment for a dough cutting or embossing machine, including as elements a bed plate, a plurality of embossing blocks and corresponding cutting elements secured to the bed plate, individual stripper elements slidable lengthwise of the embossing blocks, each yieldingly secured relative to the face of its respective embossing block and the bed plate, and adaptable to engage the dough sheet in advance of the embossing face, and to release after the embossing face has receded from the dough surface.

ALFRED ALLTIMES.